(12) United States Patent
Umemura et al.

(10) Patent No.: US 7,192,476 B2
(45) Date of Patent: Mar. 20, 2007

(54) FLUORESCENT WATER BASE INK FOR INK-JET RECORDING

(75) Inventors: Mayuko Umemura, Chiryu (JP); Masashi Tsuda, Aichi-ken (JP); Hideto Yamazaki, Nagoya (JP); Hiromitsu Sago, Tokai (JP); Michiko Aoyama, Nagoya (JP); Shunichi Higashiyama, Yotsukaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/968,893

(22) Filed: Oct. 21, 2004

(65) Prior Publication Data

US 2005/0150422 A1  Jul. 14, 2005

(30) Foreign Application Priority Data

Oct. 22, 2003  (JP) .............................. 2003-362499

(51) Int. Cl.
*C09D 11/02* (2006.01)

(52) U.S. Cl. ............................... 106/31.58; 106/31.32; 106/31.15

(58) Field of Classification Search ............. 106/31.58, 106/31.32, 31.15
See application file for complete search history.

(56) References Cited

U.S. PATENT DOCUMENTS

| | | | |
|---|---|---|---|
| 4,500,355 A * | 2/1985 | Shimada et al. ........... 106/31.5 |
| 4,680,235 A * | 7/1987 | Murakami et al. ........ 428/32.18 |
| 5,041,328 A * | 8/1991 | Akiya et al. .............. 428/32.37 |
| 5,140,339 A * | 8/1992 | Higuma et al. ................ 347/43 |
| 5,681,381 A | 10/1997 | Auslander et al. |
| 6,503,307 B1 * | 1/2003 | Noguchi ................... 106/31.27 |
| 6,835,239 B2 * | 12/2004 | Hakamada et al. ....... 106/31.32 |
| 2002/0047884 A1 * | 4/2002 | Nagashima et al. ......... 347/100 |
| 2004/0231554 A1 * | 11/2004 | Udagawa et al. .......... 106/31.15 |
| 2005/0052515 A1 * | 3/2005 | Udagawa et al. ........... 347/100 |
| 2005/0061199 A1 * | 3/2005 | Tsuda et al. .............. 106/31.15 |

FOREIGN PATENT DOCUMENTS

| | | |
|---|---|---|
| EP | 0 779 348 B1 | 8/2001 |
| JP | A 9-291246 | 11/1997 |

* cited by examiner

*Primary Examiner*—J. A. Lorengo
*Assistant Examiner*—Veronica Faison-Gee
(74) *Attorney, Agent, or Firm*—Oliff & Berridge, PLC

(57) ABSTRACT

A fluorescent water base ink for ink-jet recording contains a fluorescent dye having a xanthene skeleton, and a glycol. In the fluorescent dye, the difference in hydrophilic index log P is not less than 2.6 between a substituent bonded to C-9 carbon atom of the xanthene skeleton and other portion of the fluorescent dye than the substituent bonded to the C-9 carbon atom. The glycol has a distance between hydroxyl groups substantially equivalent to or longer than an interatomic distance between atoms directly bonded to C-3 and C-6 carbon atoms of the xanthene skeleton of the fluorescent dye, respectively. It is assumed that the glycol is coordinated with the xanthene skeleton in a bridge form to increase the fluorescence intensity by increasing the electron density of the xanthene skeleton. The ink having high fluorescence intensity and in which the fluorescence intensity is not lowered in a time-dependent manner is provided.

5 Claims, 1 Drawing Sheet

FLUORESCENT WATER BASE INK FOR INK-JET RECORDING

BACKGROUND OF THE INVENTION

1. Field of the Invention

The present invention relates to a fluorescent water base ink for ink-jet recording which has a high fluorescence intensity and in which the fluorescence intensity is not decreased as the time elapses.

2. Description of the Related Art

The ink-jet recording method is a recording method in which the recording is performed, for example, on the paper, the cloth, or the film by discharging the ink, for example, from the nozzle, the slit, or the porous film. Those known as the method for discharging the ink include, for example, the electrostatic attraction method in which the ink is discharged by utilizing the electrostatic attracting force, the drop-on-demand method in which the mechanical vibration or the displacement is applied to the ink by using a piezoelectric element, and the thermal ink-jet method in which bubbles are generated by heating the ink to utilize the pressure generated thereby. The recording is performed by forming ink droplets with any one of the ink discharge methods as described above, and by adhering a part or all of the ink droplets to a recording objective member.

Researches for inks, which are applicable to a variety of fields by utilizing the ink-jet recording method as described above, are progressively advanced. In particular, the fluorescent ink, which contains a fluorescent dye, has such a property that the light (exciting light) having a specified wavelength is absorbed, and the light (fluorescence) having a wavelength longer than that of the exciting light is emitted. Therefore, for example, it is tried to apply the fluorescent ink to such a way of use that information, for which any security is required, is recorded on a recording medium, and the information can be read by generating the fluorescence by radiating the ultraviolet light as the exciting light. Further, for example, Japanese Patent Application Laid-open No. 9-291246 corresponding to U.S. Pat. No. 5,681,381 discloses a water-resistant water base fluorescent ink for imprinting postal indicia.

However, the following problem has been pointed out. That is, when the printing is performed on the paper with the fluorescent water base ink containing the fluorescent dye, the fluorescence intensity is lowered after several days, although the high fluorescence intensity is obtained immediately after the printing.

SUMMARY OF THE INVENTION

The present invention has been made in order to solve the problem as described above, an object of which is to provide a fluorescent water base ink for ink-jet recording which has a high fluorescence intensity and in which the fluorescence intensity is not lowered as the time elapses.

According to the present invention, there is provided a fluorescent water base ink for ink-jet recording comprising: a fluorescent dye which has a xanthene skeleton; and a glycol, wherein:

a difference in hydrophilic index log P is not less than 2.6 between a substituent bonded to C-9 carbon atom of the xanthene skeleton of the fluorescent dye and other portion of the fluorescent dye than the substituent bonded to the C-9 carbon atom of the xanthene skeleton of the fluorescent dye; and the glycol has a distance between hydroxyl groups of the glycol which is substantially equivalent to or longer than an interatomic distance between an atom directly bonded to C-3 carbon atom of the xanthene skeleton of the fluorescent dye and an atom directly bonded to C-6 carbon atom of the xanthene skeleton of the fluorescent dye. The positions such as C-3, C-6, and C-9 of the xanthene skeleton are designated in accordance with the nomenclature specified by International Union of Pure and Applied Chemistry (IUPAC).

According to the present invention, there is also provided an ink cartridge comprising the ink of the present invention. The ink cartridge is provided with a container having any shapes for accommodating the ink. The ink cartridge may be carried on an ink-jet head, or the ink cartridge may be attached to or installed in a main case body of an ink-jet recording apparatus. In the case of the latter, the ink is supplied from the ink cartridge to the ink-jet head, for example, through a flexible tube.

DESCRIPTION OF THE PREFERRED EMBODIMENTS

Figure 1:
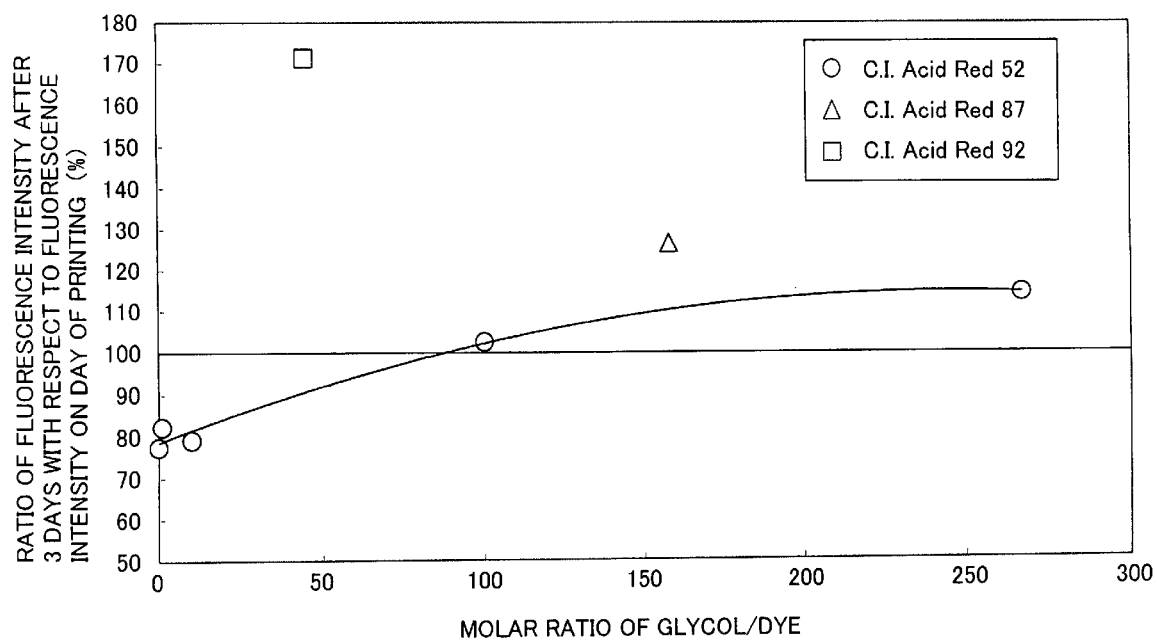
FIG. 1 shows a graph illustrating the relationship between the fluorescence intensity ratio and the molar ratio of glycol to the fluorescent dye used in Examples and Comparative Examples.

The fluorescent water base ink for ink-jet recording of the present invention contains the fluorescent dye having the xanthene skeleton and the glycol. The fluorescent dye, which has the xanthene skeleton, has an especially high fluorescence intensity among the fluorescent dyes. Even when the content is small, it is possible to obtain the fluorescent ink having the high fluorescence intensity. The chemical formula, which represents the fluorescent dye having the xanthene skeleton, is shown in the following formula (1). The numbers, which are affixed to the carbon atoms in the following formula (1), indicate the position numbers of carbon atoms designated in accordance with the nomenclature specified by International Union of Pure and Applied Chemistry (IUPAC). In this specification, all of the position numbers are designated in accordance with the nomenclature specified by International Union of Pure and Applied Chemistry (IUPAC).

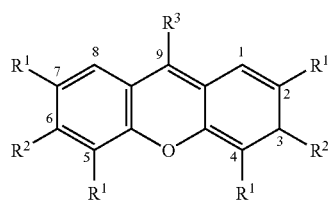

(1)

$R^1$: hydrogen or halogen group
$R^2$: =O, —ONa, —$NR^4R^5$ or

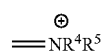

($R^4$, $R^5$: hydrogen or alkyl group)
$R^3$:

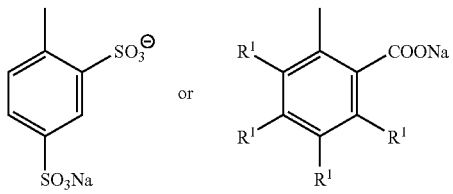

In the formula (1), $R^1$'s may be independently the same or different, and $R^2$'s may be the same or different. $R^4$ and $R^5$ may be the same or different. In the case of the alkyl group, the alkyl group has 1 to 5 carbon atom or carbon atoms and preferably 1 to 2 carbon atom or carbon atoms.

The fluorescent dye, which is used for the fluorescent water base ink for ink-jet recording of the present invention, has the difference in hydrophilic index log P which is not less than 2.6 between the substituent bonded to the C-9 carbon atom of the xanthene skeleton and the other portion of the fluorescent dye (including the xanthene skeleton and the groups bonded thereto) than the substituent bonded to the C-9 carbon atom. If the difference in hydrophilic index log P is less than 2.6, the fluorescence intensity of the fluorescent water base ink for ink-jet recording to be obtained is lowered as the time elapses or in a time-dependent manner.

As for the examples of fluorescent dye having the xanthene skeleton as described above, the chemical formula of C.I. Basic Red 1 is shown in the following formula (2), and the chemical formula of C.I. Basic Violet 10 is shown in the following formula (3). The substituent, which is bonded to the C-9 carbon atom of the xanthene skeleton of C.I. Basic Red 1, is $COO(C_2H_5)$—$C_6H_4$— group. The substituent, which is bonded to the C-9 carbon atom of the xanthene skeleton of C.I. Basic Violet 10, is COOH—$C_6H_4$— group.

(2)

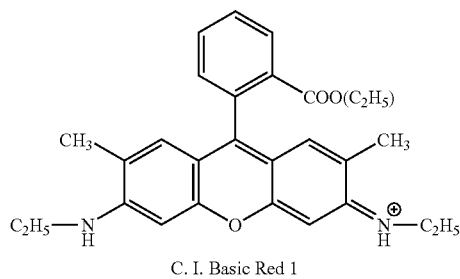

C. I. Basic Red 1

(3)

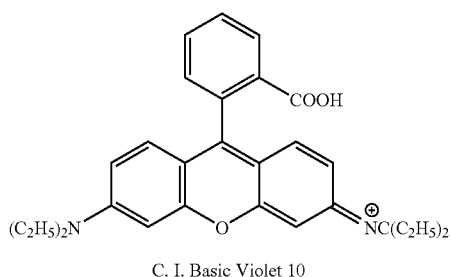

C. I. Basic Violet 10

In this specification, the hydrophilic index log P means the distribution coefficient of octanol and water, which can be determined in accordance with following expression (4).

$$\log P = 0.011 \Sigma o - 0.00067 \Sigma i - 0.905 (\Sigma i/\Sigma o) + 0.995 \quad (4)$$

In the expression (4), $\Sigma i$ represents the total of inorganic values, and $\Sigma o$ represents the total of organic values. One carbon atom has an organic value of 20, and one hydrogen atom has an inorganic value of 100, and as for the other substituents, the organic value and the inorganic value are specified for each of the other substituents. Table 1 shows log P's of the substituents bonded to the C-9 carbon atom of the xanthene skeletons of the principal fluorescent dyes each having the xanthene skeleton, and log P's of the other portion than the substituents bonded to the C-9 carbon atom of the xanthene skeletons as calculated in accordance with the expression (4).

TABLE 1

| Fluorescent dye | log P of substituent bonded to C-9 carbon atom of xanthene skeleton | lop P of other portion than substituent bonded to C-9 carbon atom of xanthene skeleton | Difference in log P |
|---|---|---|---|
| C.I. Acid Red 51 | 5.524 | −2.209 | 7.733 |
| C.I. Acid Red 52 | 4.866 | −6.020 | 10.886 |
| C.I. Acid Red 87 | 4.437 | −2.209 | 6.646 |
| C.I. Acid Red 92 | 4.437 | 1.696 | 2.741 |
| C.I. Acid Red 94 | 5.524 | 1.696 | 3.828 |
| Solvent Red 49 | 4.866 | 1.901 | 2.965 |
| C.I. Basic Red 1 | 4.366 | 2.548 | 1.818 |
| C.I. Basic Violet 10 | 4.866 | 2.281 | 2.585 |

The glycol, which is usable for the fluorescent water base ink for ink-jet recording of the present invention, has the distance between hydroxyl groups of the glycol which is substantially equivalent to or longer than the interatomic distance between the atom directly bonded to the C-3 carbon atom of the xanthene skeleton of the fluorescent dye and the atom directly bonded to the C-6 carbon atom of the xanthene skeleton of the fluorescent dye. The phrase "substantially equivalent to" herein means the fact that the distance between two hydroxyl groups of glycol is within a range of 80% to 120% of the interatomic distance between the atom directly bonded to the C-3 carbon atom of the xanthene skeleton and the atom directly bonded to the C-6 carbon atom of the xanthene skeleton. If the distance between two hydroxyl groups of glycol is less than 80%, it is considered that the glycol cannot be coordinated with the xanthene skeleton in a bridge form as described later on. It is preferable that the distance between the hydroxyl groups of the glycol is not more than 500% of (five times) the interatomic distance between the atom directly bonded to the C-3 carbon atom of the xanthene skeleton of the fluorescent dye and the atom directly bonded to the C-6 carbon atom of the xanthene skeleton. If the distance between the hydroxyl groups of the glycol exceeds five times the interatomic distance, the glycol cannot be coordinated in the bridge form with the atom directly bonded to the C-3 carbon atom of the xanthene skeleton and the atom directly bonded to the C-6 carbon atom of the xanthene skeleton as described later on. In this case, the bonding force between the fluorescent dye and the glycol is insufficient, and the fluorescence intensity after the printing is lowered in a time-dependent manner in some cases. As the above distance between the hydroxyl groups of the glycol, the distance is more preferably 90 to 200% and much more preferably 90 to 150%. In the case that the glycol is polyethylene glycol, the glycol is not dissolved in the ink solvent, if the distance between the hydroxyl groups of the glycol has a length which exceeds five times the interatomic distance between the atom directly bonded to the C-3 carbon atom of the xanthene skeleton and the atom directly bonded to the C-6 carbon atom of the xanthene skeleton.

In this specification, the interatomic distance between the atom directly bonded to the C-3 carbon atom of the xanthene skeleton of the fluorescent dye and the atom directly bonded to the C-6 carbon atom means the distance between the center of the atom directly bonded to the C-3 carbon atom of the xanthene skeleton of the fluorescent dye and the center of the atom directly bonded to the C-6 carbon atom of the xanthene skeleton of the fluorescent dye. Specifically, for example, the interatomic distance means the distance between the center of the nitrogen atom bonded to C-3 carbon atom and the center of the nitrogen atom bonded to C-6 carbon atom in the case of C.I. Basic Red 1 represented by the foregoing formula (2), and the interatomic distance means the distance between the center of the nitrogen atom bonded to C-3 carbon atom and the center of the nitrogen atom bonded to C-6 carbon atom in the case of C.I. Basic Violet 10 represented by the foregoing formula (3).

The distance between the hydroxyl groups of the glycol means the distance between the center of the oxygen atom of one hydroxyl group possessed by the glycol and the center of the oxygen atom of the other hydroxyl group possessed by the glycol. Specifically, for example, the distance between the hydroxyl groups of the glycol means the distance between the centers of the oxygen atoms of the hydroxyl groups disposed at the both terminal ends of triethylene glycol represented by the following formula (5) or polypropylene glycol represented by the following formula (6). The interatomic distance as described above can be calculated, for example, by using a software such as Chem 3D produced by Fujitsu. The interatomic distance of the compound described in this specification is represented by the distance obtained by depicting the molecular structure of the compound by using Chem 3D produced by Fujitsu, and then effecting "Minimize Energy" (minimization of the energy) in Chem 3D.

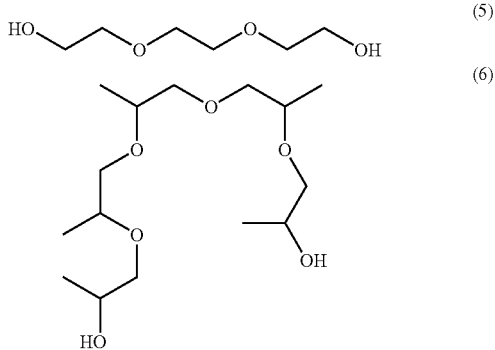

(5)

(6)

The atomic distance between the atom directly bonded to the C-3 carbon atom of the xanthene skeleton and the atom directly bonded to the C-6 carbon atom of the xanthene skeleton of each of the principal fluorescent dyes having the xanthene skeleton is shown in Table 2, and the distance of the hydrogen groups of each of the principal glycols is shown in Table 3.

TABLE 2

| | Atomic distance between atom directly bonded to C-3 carbon atom of xanthene skeleton and atom directly bonded to C-6 carbon atom of xanthene skeleton (Å) |
|---|---|
| C.I. Acid Red 51 | 9.870 |
| C.I. Acid Red 52 | 9.772 |
| C.I. Acid Red 87 | 9.572 |
| C.I. Acid Red 92 | 9.587 |
| C.I. Acid Red 94 | 9.574 |
| C.I. Basic Red 1 | 9.684 |
| C.I. Basic Violet 10 | 9.707 |

TABLE 3

| Glycol | Distance between hydroxyl groups (Å) |
|---|---|
| Ethylene glycol | 3.652 |
| Diethylene glycol | 7.155 |
| Triethylene glycol | 10.740 |
| Polyethylene glycol #200 | about 14.280 |
| Propylene glycol | 2.704 |
| Dipropylene glycol | 6.195 |
| Tripropylene glycol | 8.873 |
| Polypropylene glycol #400 | about 17.210 |

In Table 3, the average values are shown for polyethylene glycol #200 and polypropylene glycol #400 because of the presence of the molecular weight distribution.

The inventors have found out that the fluorescent water base ink for ink-jet recording, which has the high fluorescence intensity and in which the fluorescence intensity is not lowered as the time elapses even after the printing, is obtained by using, in combination, the fluorescent dye and the glycol which satisfy the requirements as described above. Thus, the present invention has been completed. Although the principle of such a feature is not clearly revealed, the inventors believe that it is based on the following theory.

In general, the fact that the substance is dissolved in a certain solvent means the fact that the solvent molecules solvate the substance. That is, the fact that the dye is dissolved in the water base ink means the fact that the dye molecules are solvated by water molecules and other solvent molecules. In this situation, the structure of the dye determines the portions which are solvated by water molecules and other solvent molecules and the degree of the salvation. This feature is equivalently applicable to the fluorescent dye having the xanthene skeleton as well.

According to the knowledge of the inventors, it has been revealed for the fluorescent dye having the xanthene skeleton that the molecule such as the glycol, the glycol ether, and the pyrrolidone, which has the function to enhance the fluorescence intensity, is coordinated with the atoms which are directly bonded to the C-3 and C-6 positions of the carbon atoms of the xanthene skeleton, and thus the fluorescence intensity is enhanced. Therefore, in order to obtain the high fluorescence intensity, it is important that the specified solvent molecule, which has the function to enhance the fluorescence intensity as described above, is effectively coordinated with the specified position of the fluorescent dye molecule. However, if the fluorescent dye having the xanthene skeleton is dissolved in water under ordinary conditions, a lot of water molecules are preferentially coordinated with the fluorescent dye molecule. The solvent molecule, which has the function to enhance the fluorescence intensity, is hardly coordinated with the fluorescent dye molecule, and it is difficult to obtain the effect to enhance the fluorescent intensity.

On the contrary, it is considered that the specified solvent molecule, which has the function to enhance the fluorescence intensity, can be effectively coordinated with the specified position of the fluorescent dye molecule by providing the difference in hydrophilicity in the molecular structure of the fluorescent dye having the xanthene skeleton. In the fluorescent dye having the xanthene skeleton, when the hydrophilicity of the substituent bonded to the C-9 carbon atom of the xanthene skeleton is higher than that of the other portion of the fluorescent dye than the substituent bonded to the C-9 carbon atom, the water molecule is preferentially coordinated with the substituent bonded to the C-9 carbon atom, while the solvent molecule, which has the function to enhance the fluorescence intensity, is preferentially coordinated with the other portion of the fluorescent dye than the substituent bonded to the C-9 carbon atom, especially the portions containing the atoms directly bonded to the C-3 and C-6 carbon atoms of the xanthene skeleton, respectively. Thus, it is considered that the high fluorescence intensity is obtained.

On the other hand, even when the specified solvent molecule, which has the function to enhance the fluorescence intensity, is coordinated with the specified position of the xanthene skeleton as described above, the fluorescence intensity is consequently decreased in a time-dependent manner after the printing, when the specified solvent molecule, which has the function to enhance the fluorescence intensity, is easily separated therefrom after the printing. The glycol ether, which is included in the specified solvent molecule having the function to enhance the fluorescence intensity such as the glycol, the glycol ether, and the pyrrolidone as described above, has the high hydrophobicity, because one or both of the molecular ends is/are ether group or ether groups. The glycol ether is separated from the fluorescent dye, because the glycol ether immediately permeates in the thickness direction and the fiber direction of the paper on the paper surface. On the other hand, the pyrrolidone is separated from the fluorescent dye due to the evaporation as the time elapses, because the vapor pressure of the pyrrolidone is high. On the contrary, the glycol has a relatively slow permeation speed on the paper, because the hydrophilicity is high as compared with the glycol ether. Further, the glycol has a low vapor pressure. Therefore, the glycol is effective in relation to the decrease in the fluorescence intensity in the time-dependent manner. Further, the glycol is advantageous in relation to the structure of the foregoing fluorescent dye for the following reason. The glycol has the terminal OH groups. Therefore, the glycol is easily coordinated in the bridge form so that the terminal OH groups are coordinated with the portions containing atoms directly bonded to C-3 and C-6 carbon atoms of the xanthene skeleton of the fluorescent dye. It is considered that the coordination in the bridge form further increases the electron density of the xanthene skeleton in cooperation with the electron resonance structure of the xanthene skeleton, and hence the fluorescence intensity of the fluorescent dye is consequently increased. On the other hand, if the solvent is the glycol ether, the coordination of the glycol ether with the fluorescent dye hardly occurs at the portions containing atoms directly bonded to C-3 and C-6 carbon atoms of the xanthene skeleton as described above, because the glycol ether has the hydrophilic group and the hydrophobic group.

It is considered that the fluorescence intensity is not increased so much as compared with the glycol. It is considered that the fluorescence intensity is not increased so much by the pyrrolidone as well as compared with the glycol, because the bridge form is hardly brought about unlike the glycol.

Further, when the distance between the hydroxyl groups of the glycol is not less than the interatomic distance between the atom which is directly bonded to the C-3 carbon atom of the xanthene skeleton of the fluorescent dye and the atom which is directly bonded to the C-6 carbon atom of the xanthene skeleton of the fluorescent dye, the glycol can be coordinated in the bridge form with the atom which is directly bonded to the C-3 carbon atom of the xanthene skeleton and the atom which is directly bonded to the C-6 carbon atom of the xanthene skeleton. Thus, the bond between the fluorescent dye and the glycol is strengthened. Therefore, the glycol is hardly separated from the fluorescent dye even after the printing. Therefore, it is possible to suppress the time-dependent decrease in the fluorescence intensity. According to the fact described above, it is considered that the glycol is preferentially bonded at the effective positions of the fluorescent dye with the high strength by using, in combination, the fluorescent dye and the glycol which satisfy the requirements as described above, and thus the fluorescent water base ink for ink-jet recording, in which the fluorescence intensity does not undergo the time-dependent decrease in the fluorescence intensity even after the printing, is obtained.

The content of the fluorescent dye has a preferred lower limit of 0.1% by weight and a preferred upper limit of 2% by weight in the fluorescent water base ink for ink-jet recording of the present invention. If the content is less than 0.1% by weight, any sufficient fluorescence intensity is not obtained in some cases. If the content exceeds 2% by weight, the fluorescence intensity is sometimes lowered due to the occurrence of the concentration quenching phenomenon in which the exited fluorescent dye molecules undergo the transition of the non-radiation process in which the fluorescent dye molecules do not emit the energy absorbed by excitation as a light due to the interaction between the excited fluorescent dye molecules, resulting in all the more decrease in the fluorescence intensity.

The content of the glycol has a preferred lower limit of 10% by weight and a preferred upper limit of 45% by weight in the fluorescent water base ink for ink-jet recording of the present invention. If the content is less than 10% by weight, it is sometimes impossible to obtain any sufficient effect to avoid the time-dependent decrease in the fluorescence intensity. If the content exceeds 45% by weight, then the viscosity of the ink is increased, and the discharge stability of the ink is harmfully affected in some cases.

The fluorescent water base ink for ink-jet recording of the present invention contains water. As for the water, it is preferable to use those having small contents of cationic ion and anionic ion, such as ion exchange water and distilled water other than ordinary water. The content of the water depends on, for example, the characteristics of the desired ink, and the types and the compositions of the fluorescent dye and the glycol to be used. However, the content of the fluorescent dye has a preferred lower limit of 10% by weight and a preferred upper limit of 90% by weight. If the content is less than 10% by weight, the ratio of the components other than water is necessarily increased. Therefore, when the printing is performed on the paper, then the ink is blurred in some cases, and the viscosity is increased in other cases.

Therefore, it is sometimes difficult to introduce the ink into the nozzle. If the content exceeds 90% by weight, then the viscosity of the ink is excessively increased after the evaporation of volatile components, and any discharge failure is caused in some cases. The lower limit is more preferably 15% by weight, and the upper limit is more preferably 80% by weight.

The fluorescent water base ink for ink-jet recording of the present invention basically contains the components as described above. However, it is also allowable to contain, for example, conventionally known various moistening agents, permeating agents, surfactants, viscosity-adjusting agents, surface tension-adjusting agents, pH-adjusting agents, metal rust-preventive agents, specific resistance-adjusting agents, film-forming agents, ultraviolet-absorbing agents, antioxidizing agents, antifading agents, and antiseptic/fungicidal agents depending on the purpose to improve various performance including, for example, the discharge stability, the adaptability with respect to materials for the head and the ink cartridge, the storage stability, the image storage stability and the like. For example, in order to prevent the ink from being dried, it is also allowable to contain water-soluble organic solvents including, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or ketone alcohols such as acetone and diacetone alcohol or the like; ethers such as tetrahydrofuran and dioxane or the like; alkylene glycols such as thioglycol and hexylene glycol or the like; glycerol; and water-soluble organic solvent such as 1,3-dimethyl-2-imidazolidinone. In particular, glycerol is preferred. When the ink contains water and glycerol, it is desirable to adopt such weights that $GC \leq GO < W$ holds provided that the weights of water, glycol, and glycerol in the ink are represented by W, GO, and GC respectively.

In order to quicken the drying speed on the paper surface after the printing, the ink may also contain, for example, glycol-based ethers including, for example, ethylene glycol monomethyl ether, ethylene glycol monoethyl ether, ethylene glycol monopropyl ether, diethylene glycol monomethyl ether, diethylene glycol monoethyl ether, diethylene glycol monopropyl ether, triethylene glycol monomethyl ether, triethylene glycol monoethyl ether, triethylene glycol monopropyl ether, propylene glycol monomethyl ether, propylene glycol monoethyl ether, propylene glycol monopropyl ether, dipropylene glycol monomethyl ether, dipropylene glycol monoethyl ether, dipropylene glycol monopropyl ether, tripropylene glycol monomethyl ether, tripropylene glycol monoethyl ether, and tripropylene glycol monopropyl ether.

Further, in order to adjust the viscosity of the ink, the ink may also contain, for example, polyvinyl alcohol, cellulose, and water-soluble resins, which may be used singly or in combination.

When the fluorescent water base ink for ink-jet recording of the present invention is applied to the ink-jet method in which the jetting operation is performed in accordance with the action of thermal energy, it is also allowable to adjust thermal physical values including, for example, the specific heat, the coefficient of thermal expansion, and the coefficient of thermal conductivity.

The present invention will be explained in further detail below as exemplified by Examples. However, the present invention is not limited to only Examples.

EXAMPLES 1 to 3

Fluorescent dyes and glycols shown in Table 4, water, and glycerol as a moistening agent were prepared in accordance with compositions shown in Table 4. The prepared ink materials were agitated, followed by being filtrated through a membrane filter of 0.2 μm to prepare inks of Examples 1 to 3. Table 4 shows a difference in hydrophilic index log P between a substituent bonded to C-9 carbon atom of the xanthene skeleton of the fluorescent dye and other portion of the fluorescent dye than the substituent bonded to the C-9 carbon atom. The difference in hydrophilic index log P of the fluorescent dye employed in each of the inks of the examples is not less than 2.6. Table 4 also shows the interatomic distance between the atom directly bonded to C-3 carbon atom of the xanthene skeleton of the employed fluorescent dye and the atom directly bonded to C-6 carbon atom of the xanthene skeleton of the employed fluorescent dye, and the distance between the hydroxyl groups of the employed glycol. The distance between the hydroxyl groups of the glycol employed in each of the inks of Examples is longer than the interatomic distance between the atom directly bonded to C-3 carbon atom of the xanthene skeleton of the fluorescent dye and the atom directly bonded to C-6 carbon atom of the xanthene skeleton of the fluorescent dye. Table 4 also shows, as the molar ratio, the amount of the glycol with respect to the fluorescent dye.

COMPARATIVE EXAMPLE 1 to 3

Fluorescent dyes and glycols shown in Table 4, water, and glycerol as a moistening agent were prepared in accordance with compositions shown in Table 4. The prepared ink materials were agitated, followed by being filtrated through a membrane filter of 0.2 μm to prepare inks of Comparative Examples 1 to 3. The difference in hydrophilic index log P in the fluorescent dye employed in each of the inks of Comparative Examples 1 and 2 is less than 2.6. Also, the distance between the hydroxyl groups of the glycol employed in each of the inks of Comparative Example 2 and 3 is shorter than 80% of the interatomic distance between the atom directly bonded to C-3 carbon atom of the xanthene skeleton of the fluorescent dye and the atom directly bonded to C-6 carbon atom of the xanthene skeleton (for example, in Comparative Example 3, the distance between the hydroxyl groups of diethylene glycol was about 75% of the interatomic distance between the atom directly bonded to C-3 carbon atom of the xanthene skeleton of the fluorescent dye and the atom directly bonded to C-6 carbon atom of the xanthene skeleton. Table 4 also shows, as the molar ratio, the amount of the glycol with respect to the fluorescent dye.

EVALUATION

The recording was performed on the regular paper (XEROX 4200 produced by XEROX) by using an ink-jet printer (MFC-5100J produced by Brother Kogyo Kabushiki Kaisha) with the inks prepared in Examples 1 to 3 and Comparative Examples 1 to 3. A portion, in which the coating ratio was 100%, was used as a recording sample. The peak intensity which was designated as the fluorescence intensity was measured by using a fluorescence spectrophotometer (F-4500 produced by Hitachi High-Technologies Corporation) on the day of the printing and after storing the sample for 3 days at ambient temperature and ordinary pressure after the printing. In the measurement of the fluorescence intensity, the exciting light source had a wavelength of 254 nm, and the fluorescence intensity was measured at a wavelength of 600 nm. The fluorescence intensity was evaluated in accordance with the following criteria. The evaluation was made in accordance with the following criteria on the basis of the fluorescence intensities obtained on the day of the printing and 3 days after the printing. Obtained results are shown in Table 4.

A: the fluorescence intensity obtained 3 days after the printing was not less than 100% as compared with the fluorescence intensity obtained on the day of the printing.
B: the fluorescence intensity obtained 3 days after the printing was not less than 80% and less than 100% as compared with the fluorescence intensity obtained on the day of the printing.
C: the fluorescence intensity obtained 3 days after the printing was less than 80% as compared with the fluorescence intensity obtained on the day of the printing.

the ink prepared in Example 1 to prepare Samples 1 to 4. The fluorescence intensity was measured and evaluated for each of the prepared samples in the same manner as in Example 1. Obtained results are shown in Table 5. The graph in FIG. 1 shows the relationship between the fluorescence intensity and the molar ratio of triethylene glycol to C.I. Acid Red 52 in relation to the ink of Example 1 and Samples 1 to 4. The results of Examples 2 and 3 are also shown in FIG. 1 together. According to the graph, it is appreciated that the fluorescence intensity is maintained 3 days after the printing

TABLE 4

| | | | Example 1 | Example 2 | Example 3 |
|---|---|---|---|---|---|
| Ink composition | Fluorescent dye | Name | C.I. Acid Red 52 | C.I. Acid Red 87 | C.I. Acid Red 92 |
| | | Difference in log P | 10.886 | 6.646 | 2.741 |
| | | Distance between atom directly bonded to C-3 carbon atom of the xanthene skeleton and atom directly bonded to C-6 carbon atom of the xanthene skeleton (Å) | 9.772 | 9.572 | 9.587 |
| | | Blending amount (% by weight) | 0.5 | 1.5 | 0.2 |
| | Glycol | Type | triethylene glycol | polyethylene glycol #200 | polypropylene glycol #400 |
| | | Distance between hydroxyl groups (Å) | 10.74 | about 14.28 | about 17.21 |
| | | Blending amount (% by weight) | 35.0 | 20.0 | 15.0 |
| | Moistening agent (glycerol) (% by weight) | | 5.0 | 10.0 | 15.0 |
| | Pure water (% by weight) | | 59.5 | 68.5 | 69.8 |
| | Molar ratio (glycol/dye) | | 267 | 45 | 158 |
| Evaluation | (1) Fluorescence intensity on day of printing | | 205 | 98 | 105 |
| | (2) Fluorescence intensity 3 days after printing | | 235 | 168 | 133 |
| | (2)/(1) (%) | | 114.6 | 171.4 | 126.7 |
| | Evaluation | | A | A | A |

| | | | Comp. Ex. 1 | Comp. Ex. 2 | Comp. Ex. 3 |
|---|---|---|---|---|---|
| Ink composition | Fluorescent dye | Name | C.I. Basic Red 1 | C.I. Basic Violet 10 | C.I. Acid Red 92 |
| | | Difference in log P | 1.818 | 2.585 | 2.741 |
| | | Distance between atom directly bonded to C-3 carbon atom of the xanthene skeleton and atom directly bonded to C-6 carbon atom of the xanthene skeleton (Å) | 9.684 | 9.707 | 9.587 |
| | | Blending amount (% by weight) | 0.5 | 1.0 | 0.5 |
| | Glycol | Type | polypropylene glycol #400 | ethylene glycol | diethylene glycol |
| | | Distance between hydroxyl groups (Å) | about 17.21 | 3.652 | 7.155 |
| | | Blending amount (% by weight) | 30.0 | 30.0 | 25.0 |
| | Moistening agent (glycerol) (% by weight) | | 15.0 | 10.0 | 15.0 |
| | Pure water (% by weight) | | 54.5 | 59.0 | 59.5 |
| | Molar ratio (glycol/dye) | | 75 | 229 | 383 |
| Evaluation | (1) Fluorescence intensity on day of printing | | 188 | 162 | 103 |
| | (2) Fluorescence intensity 3 days after printing | | 150 | 108 | 80 |
| | (2)/(1) (%) | | 79.8 | 66.7 | 77.7 |
| | Evaluation | | C | C | C |

As appreciated from Table 4, the fluorescence intensity is decreased by not less than 20% in each of the inks of Comparative Examples 1 to 3, but the fluorescence intensity is increased in each of the inks of Examples 1 to 3.

The ink composition, especially the amount of use of triethylene glycol with respect to C.I. Acid Red 52 was changed to have various values (molar ratios) in relation to when the molar ratio of triethylene glycol to C.I. Acid Red 52 exceeds 100. On the other hand, when the amount of addition of triethylene glycol is small, the fluorescence intensity is not increased so much, probably for the following reason. That is, it is considered that the probability is low for triethylene glycol to cause the interaction with the dye as described above (make the coordination in the bridge form), or the interaction is inhibited by any other substance.

TABLE 5

|  | Molecular weight | Sample 1 | Sample 2 | Sample 3 | Sample 4 |
|---|---|---|---|---|---|
| C.I. Acid Red 52 | 581 | $8.6 \times 10^{-4}$ | $8.6 \times 10^{-4}$ | $8.6 \times 10^{-3}$ | $8.6 \times 10^{-4}$ |
| Triethylene glycol | 150 | 0 | $8.6 \times 10^{-4}$ | $8.6 \times 10^{-3}$ | $8.6 \times 10^{-2}$ |
| Ratio of fluorescent dye to glycol |  | 0 | 1 | 10 | 100 |
| (1) Fluorescence intensity on day of printing | — | 102 | 130 | 125 | 159 |
| (2) Fluorescence intensity 3 days after printing | — | 79 | 107 | 99 | 163 |
| Evaluation | (2)/(1) | 77.5% C | 82.3% B | 79.2% C | 102.5% A |

According to the present invention, it is possible to provide the fluorescent water base ink for ink-jet recording which has the high fluorescence intensity and in which the fluorescence intensity is not lowered as the time elapses.

What is claimed is:

1. A fluorescent water-based ink for ink-jet recording, comprising:
    a fluorescent dye having a xanthene skeleton; and
    a glycol;
    wherein:
    a difference in hydrophilic index log P between a substituent bonded to a C-9 carbon atom of the xanthene skeleton of the fluorescent dye and an other portion of the fluorescent dye is not less than 2.6;
    a distance between hydroxyl groups of the glycol is substantially equivalent to or longer than an interatomic distance between an atom directly bonded to a C-3 carbon atom of the xanthene skeleton and an atom directly bonded to a C-6 carbon atom of the xanthene skeleton;
    the fluorescent dye is C.I. Acid Red 92; and
    the glycol is polypropylene glycol #400.

2. The ink according to claim 1, wherein the distance between hydroxyl groups of the glycol is not more than five times the interatomic distance between the atom directly bonded to the C-3 carbon atom of the xanthene skeleton and the atom directly bonded to the C-6 carbon atom of the xanthene skeleton.

3. The ink according to claim 1, wherein:
    the fluorescent dye is present in an amount of at least 0.1 weight percent to less than 2 weight percent, relative to a total weight of the ink; and
    the glycol has is present in an amount of at least 10 weight percent and less than 45 weight percent relative to the total weight of the ink.

4. The ink according to claim 1, further comprising water and glycerol, wherein:
    $GC \leqq GO < W$;
    W is a weight of the water in the ink;
    GO is a weight of the glycol in the ink; and
    GC is a weight of the glycerol in the ink.

5. An ink cartridge, comprising the ink as defined in claim 1.

* * * * *